United States Patent
Okumura et al.

(10) Patent No.: US 8,932,164 B2
(45) Date of Patent: Jan. 13, 2015

(54) WEAR-RESISTANT CHAIN

(75) Inventors: Yoshio Okumura, Kaga (JP); Mitsuru Yasuta, Kaga (JP); Yukihiro Kishi, Kaga (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 531 days.

(21) Appl. No.: 12/532,795

(22) PCT Filed: Mar. 29, 2007

(86) PCT No.: PCT/JP2007/057607
§ 371 (c)(1),
(2), (4) Date: Sep. 23, 2009

(87) PCT Pub. No.: WO2008/120401
PCT Pub. Date: Oct. 9, 2008

(65) Prior Publication Data
US 2010/0120567 A1 May 13, 2010

(51) Int. Cl.
| | |
|---|---|
| *F16H 7/06* | (2006.01) |
| *F16G 13/02* | (2006.01) |
| *B32B 9/00* | (2006.01) |
| *B32B 19/00* | (2006.01) |
| *C23C 10/52* | (2006.01) |
| *C23C 10/14* | (2006.01) |
| *C23C 10/16* | (2006.01) |
| *C23C 10/28* | (2006.01) |
| *C23C 12/00* | (2006.01) |
| *C23C 12/02* | (2006.01) |

(52) U.S. Cl.
CPC ............... *C23C 10/52* (2013.01); *C23C 10/14* (2013.01); *C23C 10/16* (2013.01); *C23C 10/28* (2013.01); *C23C 12/00* (2013.01); *C23C 12/02* (2013.01); *F16G 13/02* (2013.01)
USPC ............ 474/155; 474/156; 474/231; 428/698

(58) Field of Classification Search
USPC .......................... 474/155, 231, 156; 428/698
See application file for complete search history.

(56) References Cited

U.S. PATENT DOCUMENTS

| | | | | |
|---|---|---|---|---|
| 2,755,199 A | * | 7/1956 | Rossheim et al. ............. | 427/592 |
| 3,475,161 A | * | 10/1969 | Ramirez ........................ | 427/190 |
| 4,451,508 A | * | 5/1984 | Brown ........................... | 427/451 |
| 5,560,839 A | * | 10/1996 | Bennett et al. ................ | 216/100 |
| 5,908,486 A | * | 6/1999 | Flinn et al. ..................... | 75/232 |
| 6,068,568 A |   | 5/2000 | Kozakura et al. | |
| 6,124,564 A | * | 9/2000 | Sue et al. .................. | 219/121.47 |

(Continued)

FOREIGN PATENT DOCUMENTS

| | | |
|---|---|---|
| DE | 197 54 489 | 6/1998 |
| DE | 10 2004 041 862 | 6/2005 |

(Continued)

*Primary Examiner* — Henry Liu
(74) *Attorney, Agent, or Firm* — Jordan and Hamburg LLP

(57) ABSTRACT

There is provided a wear-resistant chain having a high durability even in severe use environments such as those of a timing chain of an engine even though it is highly efficient and productive. A miniaturizing agent containing silicon is doped in a vanadium cementation process of a base material of steel. Vanadium carbide forming a surface-hardened layer contains a secondary phase composed of an amorphous structure containing silicon within crystal grains and a crystal grain size of the vanadium carbide is miniaturized to 1 μm or less.

7 Claims, 7 Drawing Sheets

(56) References Cited

U.S. PATENT DOCUMENTS

| | | | |
|---|---|---|---|
| 7,695,575 B2 | 4/2010 | Okumura et al. | |
| 2001/0047980 A1* | 12/2001 | McNallan et al. | 216/75 |
| 2003/0033916 A1 | 2/2003 | Blank et al. | |
| 2004/0018905 A1* | 1/2004 | Okabe et al. | 474/231 |
| 2004/0043230 A1* | 3/2004 | Hatono et al. | 428/458 |
| 2005/0090348 A1* | 4/2005 | Tohara | 474/155 |
| 2009/0130434 A1* | 5/2009 | Zhu et al. | 428/328 |

FOREIGN PATENT DOCUMENTS

| | | |
|---|---|---|
| EP | 1 635 087 | 3/2006 |
| JP | 62-37679 | 9/1987 |
| JP | 2003-127094 | 5/2003 |
| JP | 2004-360755 | 12/2004 |
| JP | 2005-290435 | 10/2005 |
| JP | 2005-299800 | 10/2005 |
| JP | 2006-336056 | 12/2006 |

* cited by examiner

X 30,000

FIG.5A
FIG.5B
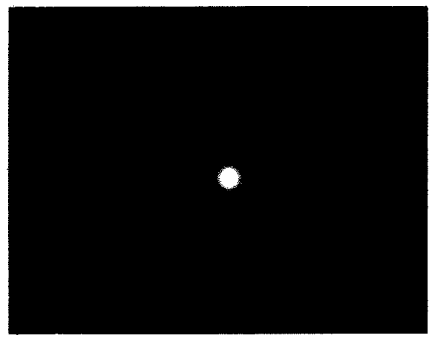
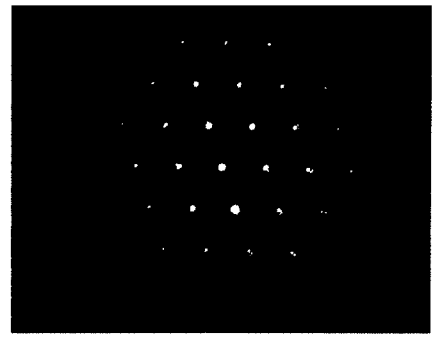
ULTRA-FINE ELECTRON DIFFRACTION IMAGE OF SECONDARY PHASE WITHIN VC GRAIN
ULTRA-FINE ELECTRON DIFFRACTION IMAGE OF VC MATRIX PHASE

WEAR-RESISTANT CHAIN

The present invention relates to a transmission chain such as a silent chain, a roller chain and the like and more specifically to a wear-resistant chain in which a surface-hardened layer containing vanadium carbide is formed over each bearing section where a pin and a link plate or a pin and a bush rotate relatively from each other in the chain described above.

Lately, a transmission chain, e.g., a timing chain of an engine, is often used in severe conditions where high surface pressure is repeatedly applied in a high temperature environment and where mixing of soot into engine oil is promoted not only for a diesel engine but also for a gasoline engine due to an increase of EGR because the exhaust gas control has been reinforced. Therefore, the transmission chain is required to have high durability even in such cases and to that end, there has been proposed a transmission chain in which a surface-hardened layer composed of vanadium carbide (VC) is formed over parts such as a pin that forms a bearing (see Japanese Patent Application Laid-Open No. 2004-360755).

Generally, a powder packing method by means of a rotary retort is used to treat and coat the vanadium carbide on the surface of the pin or the like. In the powder packing method, a pin base material made of steel is put into a furnace together with powder containing vanadium such as ferrovanadium (FeV), a sintering preventing material such as alumina ($Al_2O_3$) and an accelerator such as ammonium chloride ($NH_4Cl$), and the furnace is kept at a predetermined temperature to cement and coat the vanadium carbide of a predetermined film thickness on the surface of the pin.

While the thickness of the vanadium carbide layer thus obtained is 6 to 15 µm and grain size of the vanadium carbide is around 1 to 3 µm in general, it is required to increase the treatment temperature to or more than 1050° C. for example to thicken the vanadium carbide layer and to improve its durability. When the treatment temperature is increased, however, the crystal grain size of the vanadium carbide layer (VxCy: $V_8C_7$ for example) becomes coarse. When the grain size is coarse, the vanadium carbide layer is apt to peel out off the (pin) base material, thus lowering adhesion (bond) with the base material.

When the treatment temperature is lowered to suppress the grain size of the vanadium carbide from becoming coarse on the other hand, it becomes unable to obtain a desirable thickness and hence to obtain an enough wear-resistant life. Although it is conceivable to prolong a treatment period of time while keeping the treatment temperature low to obtain the desirable thickness, there may be a case when the desirable thickness cannot be obtained just by prolonging the treatment period of time. Even if the desirable thickness may be obtained, it is not practical because it may be a long time process that remarkably hampers economics.

There has been also proposed a method of preventing abnormal wear elongation in a wear-resistant chain in which a hardened layer composed of metal carbide such as vanadium is formed on its surface by recovering pH of lubricant oil by neutralizing it by distributing $Si_3N_4$ particles in the hardened layer even if the highly oxidized lubricant oil that have extremely degenerated in an engine room is used together as disclosed in Japanese Patent Laid-Open No. 2005-299800.

SUMMARY OF THE INVENTION

As described above, while the vanadium carbide layer formed on the bearing section such as the pin of the chain is required to have the certain thickness to assure the enough durability in the severe use conditions such as those of the timing chain of the engine, it is effective to treat it in a short period time at high temperature in order to obtain the desirable thickness.

However, if the high temperature treatment is carried out in the conventional vanadium cementation process, there is a possibility of coarsening the grain size of the coating film of vanadium carbide and of not being able to assure product quality in terms of adhesion of the coating film.

Accordingly, it is an object of the invention to provide a wear-resistant chain fully durable even in severe use conditions, even though it is highly efficient and productive.

The invention is what achieves so-called antinomic matters, from an aspect of technological commonsense, of miniaturizing the grain size of the vanadium carbide while obtaining the desirable thickness. This is also what has been achieved by inventors of the present invention as a result of ardent study of various third elements to be doped beside the powder containing vanadium, sintering preventing material and accelerator in the vanadium cementation process and of manners for doping the element by specifically noticing on silicon (Si) as the element to be doped.

The invention allows the VC grain size to be miniaturized while obtaining the desirable thickness, even though it allows the vanadium cementation process to be carried out economically and efficiently through a high temperature treatment of around 1050° C. for example.

The invention is directed to a wear-resistant chain having a hardened layer containing vanadium carbide (e.g., $V_8C_7$) that is formed on the surface of a base material made of steel that forms at least either one of chain components of a pin and a link plate (of a silent chain for example) or a pin and a bush (of a roller chain for example) that relatively rotate and form a bearing section.

In the chain, the hardened layer has a secondary phase composed of an amorphous structure containing silicon (Si) within the crystal grain of the vanadium carbide and a typical crystal grain size of the vanadium carbide is 1 µm or less, or more preferably, 500 nm or less.

Thereby, the secondary phases each composed of the amorphous structure are dispersed within the crystal grain of the vanadium carbide, allowing the crystal of the vanadium carbide to be miniaturized to 1 µm or less in the hardened layer containing the vanadium carbide. Thereby, the chain such as a timing chain for use in an engine for example may have high durability even in severe use conditions.

Specifically, the vanadium carbide may contain 0.05 to 0.5 wt % of silicon or more preferably 0.15 to 0.3 wt % of silicon, beside vanadium and carbon.

Thus, the grain size of the crystal of vanadium carbide may be considerably miniaturized just by doping a trace amount, e.g., 0.05 to 0.5 wt %, of silicon within the crystal grain.

Furthermore, the chain component may be formed through the cementation process carried out on the base material made of steel at a predetermined temperature within a gaseous atmosphere containing vanadium and a miniaturizing agent containing silicon is doped in conducting the cementation process.

Thus, it becomes possible to obtain the single layer of the vanadium carbide having the predetermined thickness and composed of the miniaturized crystal gains through the highly productive and efficient process in high temperature just by doping the miniaturizing agent containing silicon in conducting the vanadium cementation process.

BRIEF DESCRIPTION OF THE DRAWINGS

FIGS. 1A and 1B are photographs of structure of hardened layer parts taken by a scanning electron microscope, wherein FIG. 1A is a photograph of structure of a conventional vanadium carbide layer and FIG. 1B is a photograph of structure of a vanadium carbide layer of the invention.

FIGS. 5A and 5B are photographs showing ultra-fine electron diffraction images, wherein FIG. 5A shows a diffraction image obtained at the secondary phase within the VC grain and FIG. 5B shows a diffraction image obtained at the VC matrix phase.

DETAILED DESCRIPTION OF THE INVENTION

Figure 1A:
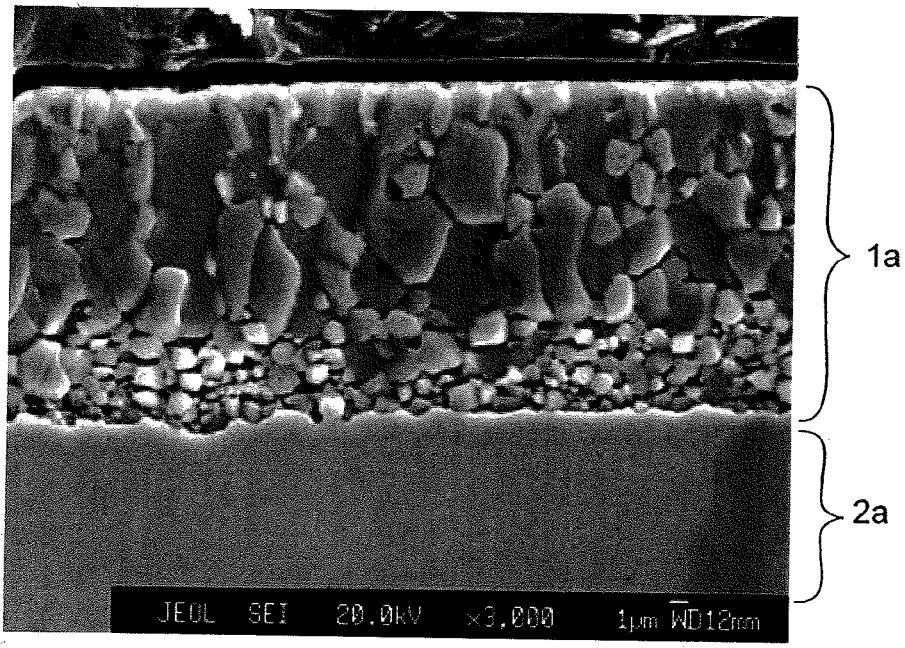

An embodiment of the invention will be explained below. A chain of the invention will be applicable to all kinds of power transmission chains including a known roller chain, a silent chain and the like and is especially suitably applicable to a chain such as a timing chain for use within an engine.

The roller chain is constructed by endlessly linking pin links in which both ends of two pin link plates are linked by pins with roller links in which both ends of two roller link plates are similarly linked by bushes by inserting the pins into the bushes and by idly inserting rollers into the bushes. The silent chain is constructed by endlessly linking guide trains composed of a plurality of link plates having guide link plates at both ends thereof with joint trains composed of only link plates and no guide link plate by pins fixed to the guide link plates.

Then, the roller chain causes sliding contact movements between the pins and bushes and the silent chain causes sliding contact movements between the pins and pin holes of the link plates of the joint trains every time when the chains bend. Thus, the pins and the bushes form bearing sections in the roller chain and the pins and the link plates of the joint trains also form bearing sections in the silent chain. Then, a large surface pressure is applied to the bearing sections where the sliding contact movement occurs because a large tensile force is applied to the transmission chains. The present invention is directed to the chain components forming such bearing sections. Specifically, while the invention is directed at least to either one of the pin and the bush in the roller chain and is directed at least to either one of the pin and the link plate of the joint train in the silent chain, this embodiment will be explained by directing it to the pin.

The pin, i.e., the base material, is made of steel such as carbon steel for mechanical structures such as high carbon steel or cemented steel, e.g., S50C (C, 0.47 to 0.53%, Si: 0.15 to 0.35%, Mn: 0.60 to 0.90%, P: less than 0.30%, S: 0.35% or less, Cr as impurity: 0.20% or less) and a vanadium cementation process (VC cementation process) is carried out to the pin base material (raw material) whose base material is steel (Fe). The VC cementation process (vanadizing) is carried out by putting a pin base material made of steel into a furnace together with powder containing ferrovanadium (FeV) as a cementation material, $Al_2O_3$ (alumina) as a sintering preventing material and $NH_4Cl$ (ammonium chloride) as an accelerator and by doping a small amount of a miniaturizing agent containing crystal silicon of the invention (powder of $SiO_2$ for example). Temperature within the furnace is increased to 900° C. to 1,100° C., which is kept for a predetermined period of time. The VC cementation process advances within the furnace such that $NH_4Cl \rightarrow NH_3+HCl$ (gas) and HCl (gas)+V (metal powder)$\rightarrow$VCl (gas)+$H_2\uparrow$. C within the pin base material bonds with V within the atmosphere within VCl atmosphere, forming $V_8C_7$, e.g., $V_8C_7$. Then, the vanadium carbide (V) penetrates into the surface of the pin base material, forming a coating layer.

The miniaturization of the grain size of the VC is assumed to be realized by doping the small amount of miniaturizing agent containing crystal Si, e.g., $SiO_2$, as the miniaturizing agent since the miniaturizing agent containing crystal Si is thermally decomposed during the reaction of the VC cementation process and functions as nucleus during when the VC coating film is formed. A secondary phase containing Si also exists within the VC crystal grains. Since the secondary phase has an amorphous structure, Si does not become a chemical compound, thus allowing a VC coating film of the miniaturized single layer to be obtained.

The vanadium cementation process described above is carried out in a relatively short period of time at predetermined high temperature, e.g., at 1050° C., and provides a highly efficient and practical productivity. The hardened layer composed of vanadium carbide ($V_8C_7$) and having about 10 to 25 μm of thickness is formed on the surface of the pin base material made of steel and the grain size of the typical VC crystal is 1 μm or less, or more preferably, 500 nm or less.

Figure 1B:
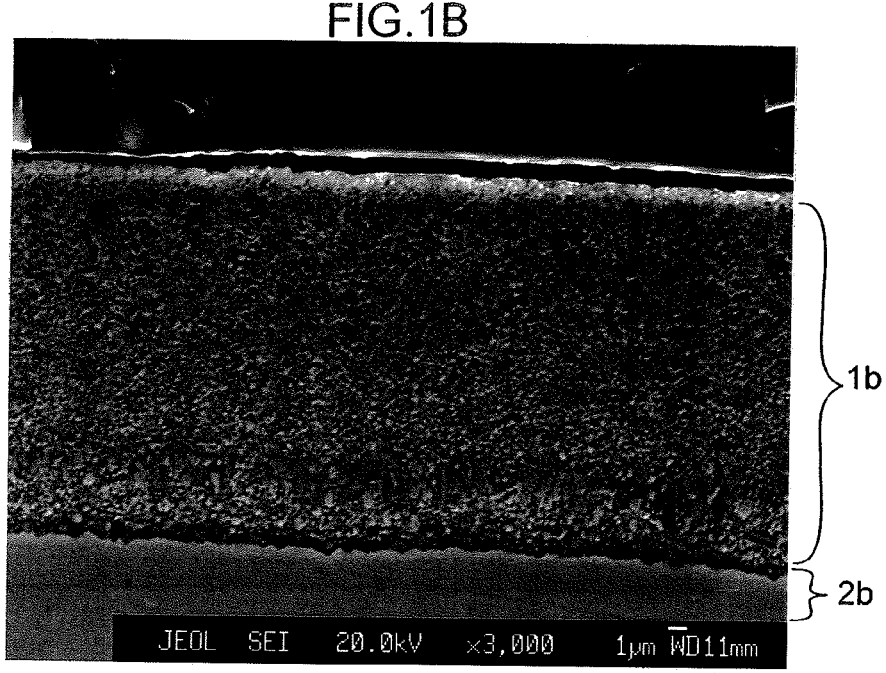

FIGS. 1A and 1B shows hardened layer parts of the pins taken by a scanning electron microscope (SEM), wherein FIG. 1A shows a conventional hardened layer and FIG. 1B shows a hardened layer of the invention. While reference numerals 1a and 1b denote the VC layers and 2a and 2b denote the base material in the figures, it can be seen that the VC layer 1b of the invention is composed of a single layer that is thick and whose VC grain size is miniaturized as compared to those of the conventional VC layer 1a.

Figure 2:
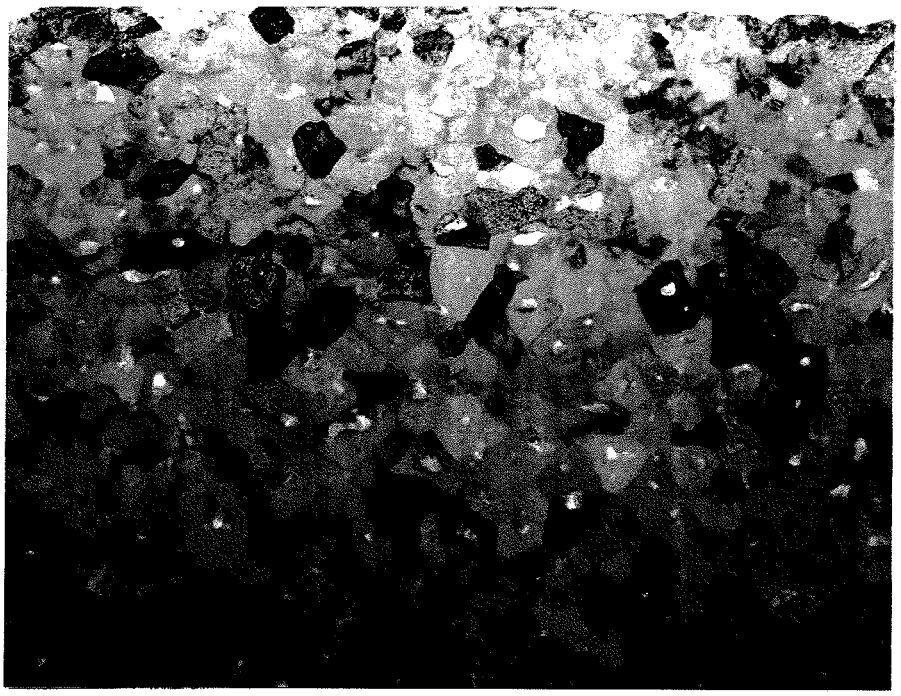
FIG. 2 is a photograph of microstructure of the vanadium carbide layer taken by a transmission electron microscope.
Figure 3:
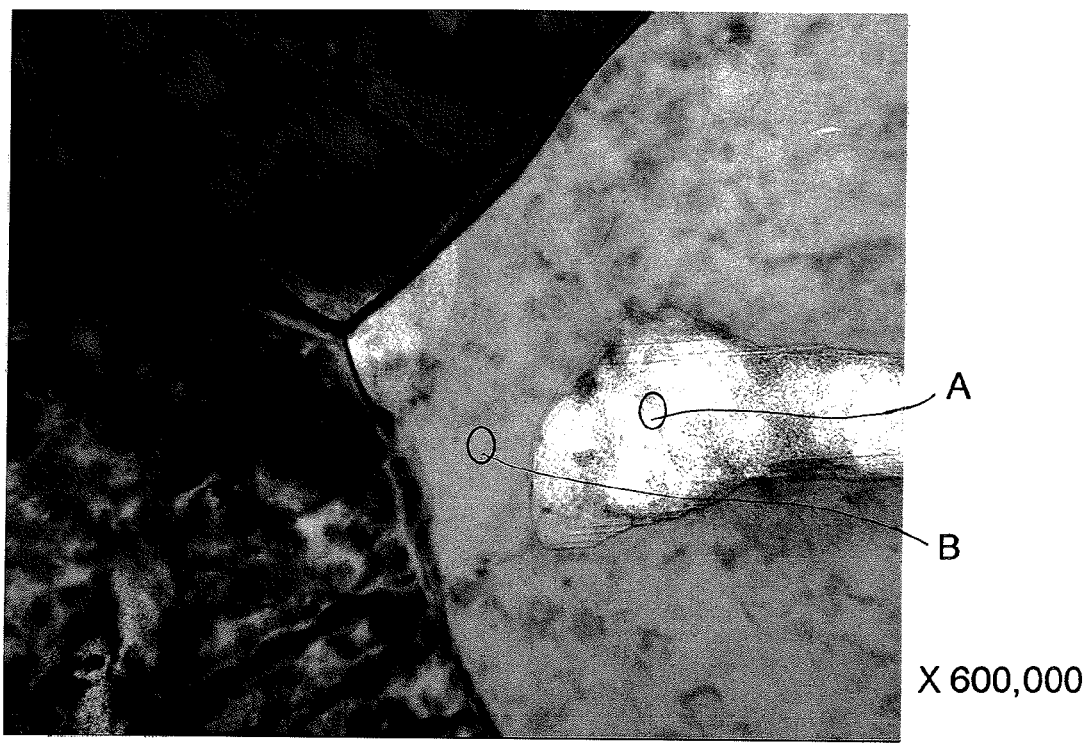
FIG. 3 is a photograph of an enlarged structure obtained by further enlarging the photograph of the microstructure in FIG. 2.
Figure 4A:
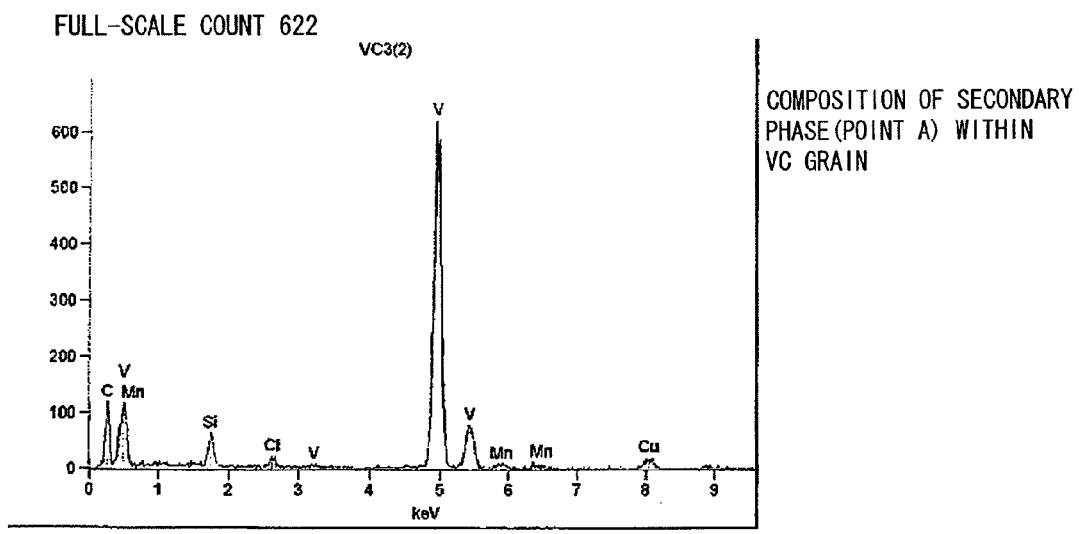
FIGS. 4A and 4B are graphs indicating composition obtained by an X-ray analyzer, wherein FIG. 4A indicates composition of a secondary phase within a VC grain and FIG. 4B indicates composition of VC matrix (phase).
Figure 4B:
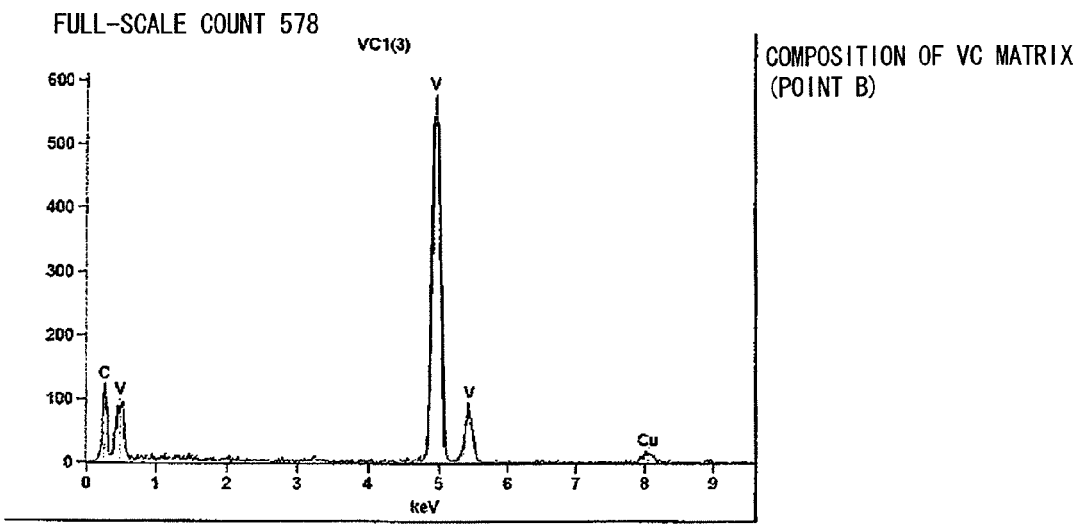

FIG. 2 shows microstructure of the VC crystal of the invention taken by a transmitting electron microscope (TEM) at 30,000 magnifications. As a result of analysis of the microstructure, it was confirmed that the grain size of the VC is 150 to 400 nm and was found that there exist the secondary phases (seen as white small dots) of several tens nm within the VC crystal. While FIG. 3 is what the microstructure is enlarged further (photographed at 600,000 magnifications), a part B denotes a base portion of the VC crystal and a part A denotes the secondary phase portion within the VC grain. FIGS. 4A and 4B are graphs showing results of component analysis of the base portion B and the secondary phase portion A carried out by means of an X-ray analyzer.

FIG. 4A indicates components of the secondary phase (the part A) within the VC grain and it is confirmed that Si exists beside V and C. FIG. 4B indicates components of the base portion (the part B) in the VC grain and indicates that there exists no Si. It is noted that Cu results from an analysis sample fixing jig and other elements are impurities. It is apparent that Si in the secondary phase is not an impurity because it is around 0.2 wt %.

FIGS. 5A and 5B show images diffracted by ultra-fine electron diffraction. FIG. 5A shows the ultra-fine diffraction image obtained by targeting to the secondary phase (part A) within the VC grain. It presents a halo pattern and thus the secondary phase is assumed to be an amorphous phase. FIG.

Figure 6:
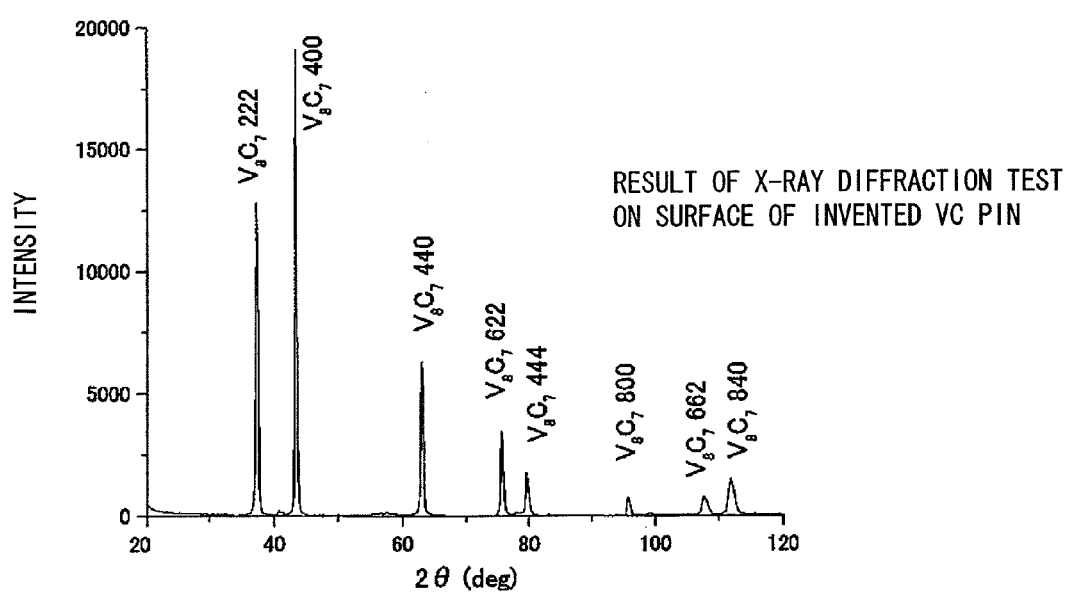
FIG. 6 shows a result of X-ray diffraction test performed on the surface of the invented VC pin.

5B shows the ultra-fine diffraction image obtained by targeting to the base part (part B) of the VC grain. FIG. 6 shows a test result of the pin of the invention conducted on the secondary phase by means of an X-ray diffracting device (XRD), wherein only VC phases ($V_8C_7$), i.e., crystal structures, are identified and no Si is analyzed. It is considered to have happened because the secondary phase is the amorphous structure that presents no diffraction phenomenon.

As a result of the analysis described above, it was confirmed as follows:

i. The surface-hardened layer of the pin of the invention is composed of the single layer of the vanadium carbide ($V_8C_7$) and the VC grains are miniaturized remarkably as compared to the conventional ones (the VC grain size is 500 nm or less).

ii. The fine secondary phase is distributed within the crystal grains of the vanadium carbide (VC) and the secondary phase is composed of the amorphous structure containing silicon (Si).

The following matters may be supposed from the above-mentioned analytical results. That is, the miniaturizing agent containing Si causes a chemical reaction and functions as nucleus in forming the VC coating film, achieving the remarkable miniaturization of the VC crystal grains by doping the trace amount of miniaturizing agent containing crystalline Si in carrying out the vanadium cementation process.

However, when high purity Si powder or Fe—Si (ferrosilicon) alloy powder is doped in carrying out the vanadium cementation process, a siliconizing reaction takes place together with the VC reaction and the coating film often results in a film having many failures such as voids in contrary without miniaturizing the VC grain size. Furthermore, when ceramic powder such as $Si_3N_4$ or SiC is doped, it was unable to confirm any effect of miniaturizing the VC grain size.

It is noted that although a pinning phenomenon of suppressing moves of crystal grain boundary by dispersing material that is effective in suppressing crystal grains from coarsening as a mechanism of miniaturizing crystal grains, it was confirmed that no material that is capable of manifesting the pinning phenomenon exists in the crystal grain boundary as a result of the TEM analysis described above. Accordingly, the VC grain size miniaturizing mechanism of the invention is considered to be caused by the improvement of the nucleus density described above.

Although the typical crystal grain size of the vanadium carbide (VC) described above is about 500 nm or less, the typical grain size may be 1 µm or less as a range of grain size that may be distinguished from the conventional one and that allows the following effects to be achieved. Furthermore, as a result of analysis of the pin of the embodiment described above, it was found that the Si content is 0.2 wt % or may be 0.15 to 0.3 wt % by taking an error or the like into consideration. However, it becomes difficult to distinguish from impurities and becomes not enough for the manifestation of the VC crystal miniaturizing effect when the Si content is 0.05 wt % or less. Furthermore, there is a possibility of causing a trouble in manifesting the miniaturizing effect as the nucleus of the VC crystals by also causing the siliconizing reaction and the like when the Si content is 0.5 wt % or more.

Figure 7:
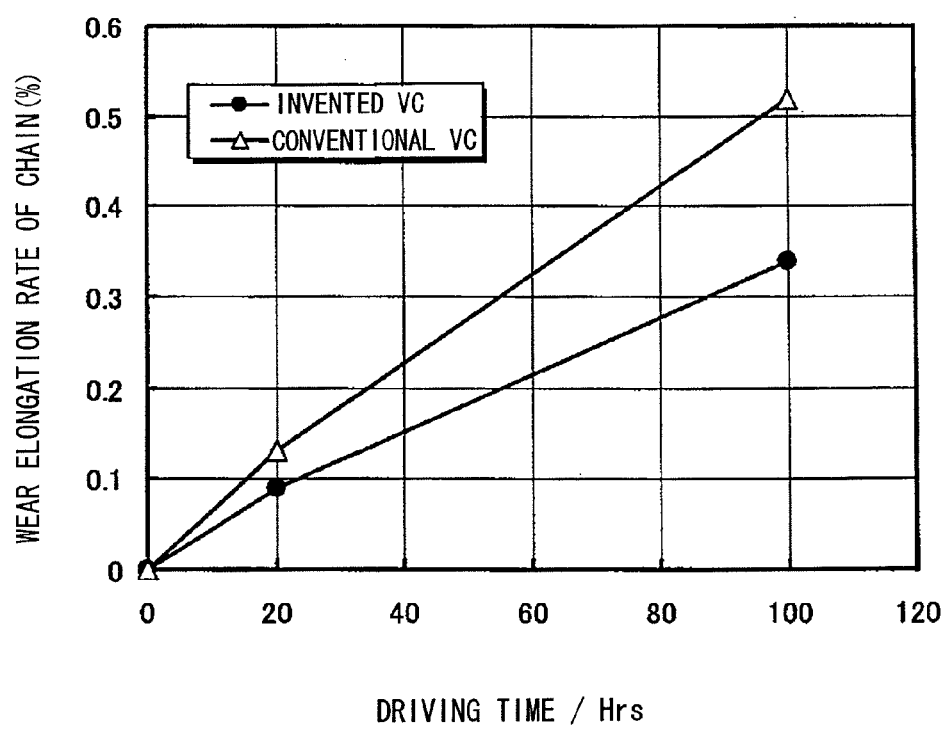
FIG. 7 is a chart showing changes of rate of elongation with respect to time when a silent chain using the inventive pin and a silent chain using a conventional vanadizing pin are operated within artificially degenerated oil.

FIG. 7 is a chart showing changes of rate of elongation with respect to time when the silent chain using the inventive pin and the silent chain using the conventional vanadizing pin are operated within artificially degenerated oil. It is noted that the artificially degenerated oil is artificial oil for simulating commercially available degenerated oil containing debris and others in order to improve the reproducibility of the test and is prepared by mixing special carbon black and the like. It was then confirmed that the durability of the silent chain of the invention (invented VC) has improved by about 35% as compared to the conventional chain (conventional VC) as shown in FIG. 7.

When a wear elongation test was carried out by using silent chains using a plurality of pins (the inventive pin, two types of conventional VC pins, i.e., three in total) whose crystal grain sizes of the vanadium carbide (VC) are different, it was found as a result that the finer the VC grain size, the more the wear-resistant performance improves and that the wear-resistant performance of the inventive pin whose grain size is the finest is best. When an analysis of wear of the pin and the pin hole of the link plate, that share the chain wear elongation, was conducted, it was found that there is a significant difference between the wear of the pin and the wear of the pin hole of the plate and that the finer the VC grain size, the less the wear of the pin holes of the plate is. Thereby, it was assumed that the wear elongation of the chain had been improved because the nature of attacking the counterpart of the bearing section was lowered due to the refined VC grain size.

It is noted that although the embodiment described above has been applied to the pin of the silent chain, it is also applicable to one or both of the bearing section, i.e., to one or both of the pin and the link plate of the joint train in the silent chain and to one or both of the pin and the bush in the roller chain, and even to a roller in some cases.

The invention is suitably applicable to the silent chain or the roller chain or specifically to the timing chain in an engine. It is applied to chain components composing the bearing section where they relatively rotate and is specifically applicable to one or both of the pin and the link plate in the silent chain and to one or both of the pin and the bush in the roller chain.

The invention claimed is:

1. An article of manufacture, comprising a base material made of steel having a surface on which a hardened layer is formed comprising crystal grains of vanadium carbide and a secondary phase within the crystal grains of said vanadium carbide, the secondary phase including silicon having an amorphous structure, the silicon not migrating from the secondary phase to the crystal structure of the vanadium carbide, wherein a typical crystal grain size of said vanadium carbide is 1 µm or less.

2. The article of manufacture of claim 1, wherein the crystal grains of vanadium carbide contain 0.05 to 0.5 wt % of silicon.

3. The article of manufacture of claim 1, wherein said hardened layer is formed by carrying out a cementation process on the base material made of steel at a predetermined temperature within a gaseous atmosphere containing vanadium; and a miniaturizing agent containing silicon is doped in carrying out said cementation process.

4. The article of manufacture of claim 2, wherein said hardened layer is formed by carrying out a cementation process on the base material made of steel at a predetermined temperature within a gaseous atmosphere containing vanadium; and a miniaturizing agent containing silicon is doped in carrying out said cementation process.

5. The article of manufacture of claim 2, wherein the hardened layer is formed by carrying out a cementation process on the base material made of steel at a predetermined temperature within a gaseous atmosphere containing vanadium; and a miniaturizing agent containing silicon is doped in carrying out the cementation process.

6. The article of manufacture of claim 1, wherein the hardened layer is a single layer.

7. The article of manufacture of any one of claims 1, 2, 3, 4, 6 and 5 wherein the article of manufacture is a wear-resistant chain and the base material made of steel on a surface of which the hardened layer is formed forms at least either one of chain components of a pin and a link plate or of a pin and a bush which relatively rotate and form a bearing section, the bearing section comprising the hardened layer.

\* \* \* \* \*